(12) United States Patent
Hoffmuller et al.

(10) Patent No.: US 9,840,071 B2
(45) Date of Patent: Dec. 12, 2017

(54) SECURITY ELEMENT AND METHOD FOR PRODUCING THE SAME

(71) Applicant: Giesecke+Devrient Currency Technology GmbH, Munich (DE)

(72) Inventors: Winfried Hoffmuller, Bad Tolz (DE); Kerstin Sander, Schliersee (DE)

(73) Assignee: Giesecke+Devrient Currency Technology GmbH, Munich (DE)

( * ) Notice: Subject to any disclaimer, the term of this patent is extended or adjusted under 35 U.S.C. 154(b) by 425 days.

(21) Appl. No.: 14/247,208

(22) Filed: Apr. 7, 2014

(65) Prior Publication Data

US 2015/0041054 A1    Feb. 12, 2015

Related U.S. Application Data

(63) Continuation of application No. 11/571,923, filed as application No. PCT/EP2005/006893 on Jun. 27, 2005, now abandoned.

(30) Foreign Application Priority Data

Jul. 14, 2004   (DE) .................. 10 2004 034 199
Jul. 23, 2004   (DE) .................. 10 2004 035 979

(51) Int. Cl.
   *B41M 3/14*    (2006.01)
   *B44F 1/12*    (2006.01)
   (Continued)

(52) U.S. Cl.
   CPC .......... *B32B 38/0008* (2013.01); *B05D 3/062* (2013.01); *B05D 3/067* (2013.01); *B05D 3/068* (2013.01); *B32B 37/12* (2013.01); *B32B 38/0036* (2013.01); *B42D 25/00* (2014.10);

*B42D 25/29* (2014.10); *B42D 25/333* (2014.10); *B42D 25/355* (2014.10); *B42D 25/47* (2014.10);
(Continued)

(58) Field of Classification Search
   CPC ........ B42D 25/00; B42D 25/47; B05D 3/062; B05D 3/067; B05D 3/068
   USPC ........................................... 427/7
   See application file for complete search history.

(56) References Cited

U.S. PATENT DOCUMENTS 4,758,296 A     7/1988   McGrew
5,660,919 A *   8/1997   Vallee .................... B41M 1/10
                                                       101/150
(Continued)

FOREIGN PATENT DOCUMENTS

DE         04132476        4/1993
DE         10163381        7/2003
(Continued)

OTHER PUBLICATIONS

U.S. Appl. No. 11/568,302, filed Oct. 25, 2006, Hoffmuller, 2007-0216518, WO 2005/105474.
(Continued)

*Primary Examiner* — Kelly M Gambetta
(74) *Attorney, Agent, or Firm* — Lathrop Gage LLP

(57) ABSTRACT

The present invention relates to a security element for a security paper, a valuable article or the like having a substrate (1), the substrate being at least partially furnished with a coating (2) that is substantially tack free at room temperature, and the coating (2) including at least one radiation-crosslinkable component.

15 Claims, 4 Drawing Sheets

Figure 1:
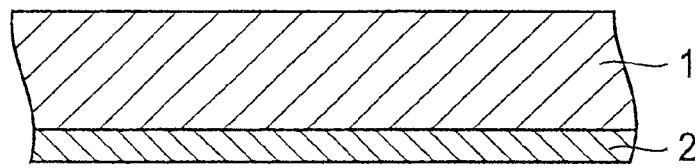

(51) Int. Cl.
  *B32B 38/00* (2006.01)
  *B42D 25/355* (2014.01)
  *B42D 25/333* (2014.01)
  *B42D 25/29* (2014.01)
  *B42D 25/00* (2014.01)
  *B42D 25/47* (2014.01)
  *B05D 3/06* (2006.01)
  *B32B 37/12* (2006.01)

(52) U.S. Cl.
  CPC ............... *B32B 2037/1253* (2013.01); *B32B 2038/0076* (2013.01); *B32B 2305/74* (2013.01); *B32B 2310/0831* (2013.01); *B32B 2310/0887* (2013.01); *B32B 2398/00* (2013.01); *B32B 2519/00* (2013.01)

(56) References Cited

U.S. PATENT DOCUMENTS

| | | | |
|---|---|---|---|
| 5,684,081 A | 11/1997 | Dannhorn et al. | |
| 5,695,589 A | 12/1997 | German et al. | |
| 5,820,971 A | 10/1998 | Kaule et al. | |
| 5,824,716 A | 10/1998 | Coqueret et al. | |
| 6,011,107 A | 1/2000 | Maxwell et al. | |
| 6,103,352 A | 8/2000 | Takahashi et al. | |
| 6,306,929 B1 | 10/2001 | Amon et al. | |
| 6,364,983 B1 * | 4/2002 | Kay ............... | B32B 38/10 156/230 |
| 2002/0015897 A1 * | 2/2002 | Toshine ............ | G03H 1/0252 430/2 |
| 2003/0213550 A1 | 11/2003 | Daems et al. | |
| 2005/0224203 A1 | 10/2005 | Boehm et al. | |
| 2007/0165182 A1 | 7/2007 | Hoffmuller | |
| 2007/0211238 A1 | 9/2007 | Hoffmuller | |
| 2007/0216518 A1 | 9/2007 | Hoffmuller | |
| 2007/0229928 A1 | 10/2007 | Hoffmuller | |
| 2007/0241551 A1 | 10/2007 | Heim | |
| 2007/0246933 A1 | 10/2007 | Heim | |
| 2007/0274559 A1 | 11/2007 | Depta | |
| 2008/0014378 A1 | 1/2008 | Hoffmuller | |
| 2008/0054621 A1 | 3/2008 | Burchard | |
| 2008/0079257 A1 | 4/2008 | Fessl | |
| 2008/0088859 A1 | 4/2008 | Depta | |
| 2008/0160226 A1 | 7/2008 | Kaule | |
| 2008/0163994 A1 | 7/2008 | Hoppe | |
| 2008/0198468 A1 | 8/2008 | Kaule | |
| 2008/0216976 A1 | 9/2008 | Ruck | |
| 2008/0250954 A1 | 10/2008 | Depta | |
| 2008/0258456 A1 | 10/2008 | Rahm | |

FOREIGN PATENT DOCUMENTS

| | | |
|---|---|---|
| EP | 0872502 | 10/1998 |
| EP | 1429212 | 6/2004 |
| WO | WO 93/05124 | 3/1993 |
| WO | WO 94/19201 | 9/1994 |
| WO | WO 05105473 | 11/2005 |
| WO | WO 05105474 | 11/2005 |
| WO | WO 05105475 | 11/2005 |
| WO | WO 05108106 | 11/2005 |
| WO | WO 05108108 | 11/2005 |
| WO | WO 05108110 | 11/2005 |
| WO | WO 2006/005434 | 1/2006 |
| WO | WO 06005434 | 1/2006 |
| WO | WO 06015733 | 2/2006 |
| WO | WO 06018171 | 2/2006 |
| WO | WO 06018172 | 2/2006 |
| WO | WO 06040069 | 4/2006 |
| WO | WO 06056342 | 6/2006 |
| WO | WO 06072380 | 7/2006 |
| WO | WO 06087138 | 8/2006 |
| WO | WO 06099971 | 9/2006 |
| WO | WO 06119896 | 11/2006 |
| WO | WO 06128607 | 12/2006 |
| WO | WO 07006445 | 1/2007 |
| WO | WO 07006455 | 1/2007 |
| WO | WO 07076952 | 7/2007 |
| WO | WO 07079851 | 7/2007 |
| WO | WO 07115648 | 10/2007 |

OTHER PUBLICATIONS

U.S. Appl. No. 11/568,386, filed Oct. 26, 2006, Hoffmuller, 2007-0229928, WO 2005/105473.
U.S. Appl. No. 11/568,388, filed Oct. 26, 2006, Hoffmuller, 2007-0211238, WO 2005/108108.
U.S. Appl. No. 11/568,390, filed Oct. 26, 2006, Hoffmuller, 2007-0165182, WO 2005/105475.
U.S. Appl. No. 11/568,535, filed Nov. 12, 2007, Depta, 2008-0088859, WO 2005/108106.
U.S. Appl. No. 11/568,538, filed Sep. 23, 2008, Depta, WO 2005/108110.
U.S. Appl. No. 11/571,923, filed Jan. 10, 2007, Hoffmuller, 2008-0014378, WO 2006/005434.
U.S. Appl. No. 11/573,060, filed Feb. 1, 2007, Depta, 2007-0274559, WO 2006/015733.
U.S. Appl. No. 11/573,484, filed Feb. 9, 2007, Heim, 2007-0246933, WO 2006/018171.
U.S. Appl. No. 11/573,506, filed Feb. 9, 2007, Burchard, 2008-0054621, WO 2006/018172.
U.S. Appl. No. 11/576,583, filed Apr. 3, 2007, Heim, 2007-0241551, WO 2006040069.
U.S. Appl. No. 11/719,843, filed in pre-exam, Kaule, WO 2006/056342.
U.S. Appl. No. 11/813,077, filed Jun. 28, 2007, Hoppe, 2008-0163994, WO 2006/072380.
U.S. Appl. No. 11/779,707, filed Jul. 18, 2007, Fessl, 2008-0079257.
U.S. Appl. No. 11/816,514, filed Aug. 16, 2007, Kaule, 2008-0160226, WO 2006/087138.
U.S. Appl. No. 11/909,115, filed Sep. 19, 2007, Kretschmar, WO 2006/099971.
U.S. Appl. No. 11/913,658, filed May 14, 2008, Ruck, 2008-0216976, WO 2006/119896.
U.S. Appl. No. 11/915,965, filed Nov. 19, 2007, Depta, 2008-0250954, WO 2006/128607.
U.S. Appl. No. 11/995,227, in pre-exam, Gruszczynski, WO 2007/006445.
U.S. Appl. No. 11/995,228, filed Jan. 10, 2008, Kaule, 2008-0198468, WO 2007/006455.
U.S. Appl. No. 12/097,668, filed Jun. 16, 2008, Rahm, 2008-0258456, WO 2007/079851.
U.S. Appl. No. 12/097,834, filed Jun. 17, 2008, Kaule, WO 2007/076952.
U.S. Appl. No. 12/294,222, in pre-exam, Hoffmuller, WO 2007/115648.
International Search Report, International Application No. PCT/EP2005/006893, 3 pages, dated Nov. 24, 2005.
International Preliminary Report on Patentability, International Application No. PCT/EP2005/006893, 4 pages.
D. Bontinck, "New developments in UV-Crosslinkable Polyurethane Dispersions," European Coatins Conference, Mar. 14-15, 2002, Berlin, pp. 169-184.
Loctite Worldwide Design Handbook, Chapter 11.5 Relay Sealing, pp. 206-209, 2004.
W. Peter et al., "Photocuring and light stabilization of water-borne wood coatings," European Coatins Conference, Mar. 14-15, 2002, Berlin, pp. 155-168.

* cited by examiner

SECURITY ELEMENT AND METHOD FOR PRODUCING THE SAME

CROSS-REFERENCE TO RELATED APPLICATIONS

This application is a continuation of U.S. application Ser. No. 11/571,923 with filing or 35 USC 371(c) date of Jan. 10, 2007, which is the U.S. National Stage of International Application No. PCT/EP05/06893, filed Jun. 27, 2005, which claims the benefit of German Patent Application 10 2004 035 979.2, filed Jul. 23, 2004, and German Patent Application No. 10 2004 034 199.0, filed Jul. 14, 2004; all of which are hereby incorporated by reference in their entireties.

The present invention relates to a security element for security papers, valuable articles or the like, having a substrate and a coating that is substantially tack free at room temperature. The invention further relates to a method for manufacturing such a security element. Furthermore, the present invention relates to a security paper and a valuable article having such a security element, and a method for manufacturing a security paper and a valuable article having such a security element.

For protection, valuable articles such as branded articles and value documents are often equipped with security elements that permit the authenticity of the valuable article to be verified, and that simultaneously serve as protection against unauthorized reproduction. Valuable articles within the meaning of the present invention include especially banknotes, stocks, identity cards, credit cards, bonds, certificates, vouchers, checks, valuable admission tickets and other papers that are at risk of counterfeiting, such as passports and other identification documents, as well as product protection elements, such as labels, seals, packaging and the like. In the following, the term "valuable article" encompasses all such articles, documents and product protection means. "Security paper", on the other hand, is understood to be the not yet circulatable precursor to a value document.

It is known to embed security elements in the form of e.g. security threads or patches in security papers or value documents, such as banknotes, securities and identification cards.

In nearly all security and banknote papers today, as a security thread, a thread coated with heat seal coating is introduced into the paper on the paper machine. Here, the heat seal coating serves to better anchor the thread in the paper. Moreover, in manufacturing banknotes, heat seal coatings are used for the application of holograms and hologram strips.

In applying security elements with the aid of heat seal coatings, at least one of the substrates to be joined is coated with a solvent-based polymer solution or an aqueous solution or dispersion. After physical drying, a tack-free surface is present. When temperature acts on it, the seal-capable mass melts and acts as an adhesive.

U.S. Pat. No. 4,758,296, for example, discloses, applied on a substrate material, a multilayer element in which an embossed hologram is produced with the aid of an embossed matrix provided with liquid resin. For the transfer to a document, the layer structure is provided with a hot-melt adhesive layer that is activated under the action of heat and pressure.

The primary disadvantage of the method according to U.S. Pat. No. 4,758,296 is the fact that a significant temperature input into the substrate is required when plasticizing the heat seal coatings, strongly impairing the quality of the substrate (e.g. paper). Moreover, banknotes and other value documents must exhibit a sufficient hot water resistance, which in turn makes a sufficiently high melting point of the heat seal system necessary.

What is extremely disadvantageous in relation to the counterfeit security of the value documents furnished with the hologram elements according to U.S. Pat. No. 4,758,296 is the fact that, by reheating the heat adhesive, the hologram element can be removed from the document again and transferred to another document. In addition, heat seal coating systems with a two-component basis, for example, as are frequently used, exhibit a storage-time-dependent melting point, which is undesirable.

In addition, in manufacturing banknotes, radiation-curing adhesives are used for applying holograms or for anchoring security threads. These adhesives are applied in liquid form without solvents (as a so-called 100% system) and, shortly before, during or immediately after the substrates are combined, crosslinked by radiation, particularly ultraviolet (UV) radiation or electron radiation.

Such a 100% UV system is described, for example, in WO 93/05124. Here, a substrate material is brought into contact with an adhesive imprinted on the substrate, while said adhesive is cured by means of UV radiation.

In WO 94/19201, too, various such adhesives are described, including a cationically reacting UV adhesive that is imprinted and activated by irradiation with UV radiation, and a blue-light-curing adhesive that is irradiated after the transfer material and substrate are brought into contact.

However, such liquid radiation-curing systems exhibit the disadvantage that they cannot be applied offline, since they would immediately lead to interlocking of the web and to adhesive transfer. In addition, such 100% systems include monomers (low-molecular compounds as a reactive thinner) that can remove themselves from UV radiation curing and thus fixation by penetrating into the paper. These non-crosslinked, often toxicologically questionable compounds can then be subsequently extracted from the paper again on contact with liquids and absorbed through the skin.

Based on that, the object of the present invention is to specify a security element of the kind cited above that avoids the disadvantages of the background art.

This object is solved by the security element having the features of the main claim. A security paper, a valuable article, a method for manufacturing a security element and a method for manufacturing a security paper or a valuable article are the subject of the coordinated claims. Developments of the present invention are the subject of the dependent claims.

According to the present invention, in the security element of the kind cited above, the substrate is at least partially furnished with a coating that is substantially tack free at room temperature. The coating includes at least one radiation-crosslinkable component.

The coating according to the present invention can be applied in the form of a solution, an emulsion or in the form of a dispersion. The radiation-crosslinkable coating applied in this form melts at low temperatures and penetrates into the substrate, which results in easy processability. Consequently, the security element according to the present invention is furnished with a low-melting, but at room temperature substantially tack-free system. The presence of a radiation-crosslinkable component in the coating permits crosslinking by irradiation to be carried out after the application of the coating. Here, a high-melting to infusible system is created, thus achieving high stability and especially sufficient hot-water resistance, e.g. in the washing machine test.

In crosslinking, the adhesion on the substrate, e.g. a pressure-pretreated foil, improves and the internal cohesion of the coating increases. The coating temperature prevailing immediately before, during and immediately after curing is an important parameter determining the achievable degree of crosslinking. At a higher temperature, a higher degree of crosslinking can be achieved, since the mobility of the reactive groups is higher.

Standard UV lacquers are liquid before crosslinking and produce considerable reaction heat, since many reactive groups are present in a tight space. The radiation- and particularly UV-curing coatings according to the present invention, on the other hand, consist of molecules with a relatively high molecular weight and are solid at room temperature. Due to the lower number of reactive groups per volume/mass unit, the reaction heat is lower. As a result, the external heat input plays a greater role in crosslinking. The mechanical properties of the coating can thus be controlled through the temperature during curing.

The not yet crosslinked security elements coated in this way can be stored without a melting point change. So, for example, foils furnished with the coating that is substantially tack free at room temperature are capable of being wound and stored for long periods without a change in the melting point.

According to an advantageous development of the present invention, the coating that is substantially tack free at room temperature is present at least physically dried. Through a slight temperature increase to, for example, 80° C., any solvent and/or water present is dispelled from the radiation-curing dispersion, solution or emulsion. The effect of this physical drying is that the coating is substantially tack free at room temperature.

In the context of the present description, the term "substantially tack free" also means substantially stick free in the sense of a smooth, substantially non-sticky surface. The check can be done through the following test: Coated foil pieces of about 100 cm² are stacked and loaded with a weight of 10 kg and stored for 72 hours at 40° C. If, afterwards, the foil pieces can be easily separated from one another without damaging the coatings, the coating is to be considered substantially tack free.

In principle, the substrate of the security element according to the present invention can be present in any form. For example, the security element according to the present invention can consist of fibers that are furnished with the coating that is substantially tack free at room temperature. However, according to an advantageous variant of the present invention, the substrate is flat with two opposing main surfaces. Preferably, only one main surface of the substrate is provided with a coating that is substantially tack free at room temperature.

In principle, it is sufficient when one main surface of the substrate is partially furnished with the coating that is substantially tack free at room temperature. However, for optimum embedding of the security element in a security paper or in a value document, it is expedient for the main surface(s) of the substrate to be contiguously provided with the coating that is substantially tack free at room temperature. However, depending on the size of the security element, it can also be sufficient for only a sub-area of the substrate to be provided with the coating that is substantially tack free at room temperature.

If the security element is completely embedded in the security paper, it has been shown to be particularly expedient if both main surfaces of the substrate are provided with the coating that is substantially tack free at room temperature. This variant is used particularly when the security element is embedded in a security paper or value document in the manner of a window security thread. Here, the main surfaces can be provided either with identical coatings or with different coatings.

According to a further preferred embodiment of the present invention, the security element exhibits a thickness of 1 μm to 100 μm, preferably a thickness of 2 μm to 50 μm. These are easily manageable security element thicknesses for furnishing value documents and security papers with security elements.

Preferably, the substrate of the security element according to the present invention is designed to be multilayer and/or flexible. The advantages associated with the multilayeredness of the security element will be described in greater detail below. The flexibility of the security element is frequently desired, since also the value documents furnished with the security element, such as banknotes or certificates, are normally flexible.

The coating that is substantially tack free at room temperature is preferably applied to the substrate as a solution, emulsion or dispersion and subsequently physically dried. Particularly preferably, an aqueous dispersion is used.

Such an aqueous dispersion can be applied directly to a substrate, to an appropriately pressure-pretreated or primed foil, i.e. a foil provided with primer (e.g. Hostaphan RNK 2600, Mitsubishi Polyester Film), or, in the cases in which further layers are present between the substrate and the coating that is substantially tack free at room temperature, to these. The foil obtained in this way can be wound, transported and stored. Through pressure and temperature (approx. 100° C. to 160° C.), the foil can be applied to paper, a further foil or a polymer.

According to a further preferred embodiment of the present invention, the dispersion is chosen from the group consisting of aliphatic polyurethane dispersions, aromatic polyurethane dispersions, acrylates, anionic acrylate-modified polyurethane dispersions, polyurethane-polyether acrylates and their mixtures.

Acrylated polyurethane dispersions are particularly well suited. Examples of such acrylated polyurethane dispersions include DW7770, DW7773, DW7825, DW7772, DW7849 (UCB, Surface Specialties) and Actilane 340 epoxy novolac acrylate in butoxyethyl acetate (Akzo).

Further radiation curing dispersions include, for example, NeoRad R-440 (NeoResins), NeoRad R-441 (NeoResins), NeoRad R-445 (NeoResins), Laromer LR 8949 (BASF), Laromer LR 8983 (BASF), Laromer LR 9005 (BASF), LUX 101 UV dispersion (Alberdingk), LUX 241 UV dispersion (Alberdingk), LUX 308 UV dispersion (Alberdingk), LUX 352 UV dispersion (Alberdingk), LUX 370 UV dispersion (Alberdingk), LUX 390 UV dispersion (Alberdingk), LUX 399 UV dispersion (Alberdingk), LUX 331 UV dispersion (Alberdingk), LUX 338 UV dispersion (Alberdingk), Halwedrol UV 95/92 W (Hüttenes-Albertus), Halwedrol UV 14/40 W (Hüttenes-Albertus), Halwedrol UV TN 6711/40 W (Hüttenes-Albertus), Halwedrol UV 65/40 W (Hüttenes-Albertus), Halwedrol UV TN 7561-3/40 W (Hüttenes-Albertus), Halwedrol UV TN 7157/40 W (Hüttenes-Albertus) and Bayhydrol UV VP LS 2280 (Bayer).

The cited dispersions include anionic and non-ionic dispersions. Most of these dispersions are aliphatic polyurethane dispersions (e.g. aliphatic polyester polyurethanes), but also aromatic polyurethane dispersions and copolymers (e.g. dispersions based on aliphatic polyurethane and acrylic acid ester copolymers), acrylates (acrylic acid ester copolymers) and anionic acrylate-modified UV-curing polyurethane dispersions or polyurethane polyether acrylates.

The solids content of the dispersion preferably lies between 30 wt. % and 60 wt. %, preferably between 35 wt. % and 50 wt. %. However, the solids content can be adjusted as needed through dilution.

Commercially available dispersions exhibit a solids content between 38 wt. and 51 wt. %. Due to their easy availability, such dispersions are preferred in the context of the present invention.

The radiation-crosslinkable component included in the coating can preferably be crosslinked by ultraviolet radiation or by electron radiation. In terms of spectral range, iron-doped emitters are particularly well suited. Alternatively, emitters with undoped mercury or emitters with gallium doping can be used. However, in curing through elements to be applied, Hg emitters exhibit a somewhat unfavorable spectral range, while Ga emitters effect a poorer surface curing.

According to a preferred embodiment, the coating that is substantially tack free at room temperature includes a photoinitiator. The crosslinking can be initiated and controlled particularly easily with the aid of a photoinitiator. Preferred examples of such photoinitiators are Darocur 4265 (Ciba), Darocur 1173 (Ciba), Irgacure 500 (Ciba), Irgacure 184 (Ciba), Esacure KIP 100 F (Lamberti) and Irgacure 2959 (Ciba).

Particularly preferably, the photoinitiator is a water-soluble photoinitiator, a water-dispersible photoinitiator or a photoinitiator that is soluble in water by means of water-compatible solvents. An example of a water-soluble initiator is Irgacure 2959 (Ciba). A water dispersible (or predispersed) initiator is e.g. Irgacure 819 DW (Ciba). An example of an initiator that is soluble with the aid of further water-compatible solvents is Lucirin TPO (BASF).

In the case of water-miscible solvents, if applicable, an elevated VOC content must be accepted when processing, since a solvent content that prevents the dropout of the photoinitiators used should be present in the finished dispersion. If this is not possible, rheological additives (anti-settling additives) must be used. In this way, it can be prevented that the dispersion must be stirred anew before each application.

According to a further preferred embodiment of the present invention, the coating that is substantially tack free at room temperature is present as a cationically radiation-curing resin. Epoxide-modified vinyl copolymers are particularly well suited. An example of such epoxide-modified vinyl copolymers is UCAR VERR-40 (The Dow Chemical Company).

The radiation-crosslinkable component included in the tack-free coating can preferably be crosslinked by shortwave radiation, such as ultraviolet radiation or shortwave visible radiation, or by electron radiation. Particularly preferably, standard UV emitters (doped or undoped) or UV light-emitting diodes can be used as the beam source.

The tack-free coating comprising the cationically radiation-curing resin preferably includes a photoinitiator that is suitable for cationic radiation curing. Aided by that, crosslinking can be initiated particularly easily. Optionally, the cationically radiation-curing resin can also be combined with further resins. Furthermore, the coating comprising the cationically curing resin can also be crosslinked only purely thermally. In this case, the use of a photoinitiator can be omitted.

Besides the coating that is substantially tack free at room temperature, the security element preferably comprises at least one further layer, this being a layer that is at least pre-crosslinked by means of radiation. This layer is preferably applied between the substrate and the coating that is substantially tack free at room temperature. By means of radiation, this layer can be crosslinked to such an extent that later plasticizing, which is associated with the threat of loss of adhesion due to decrosslinking, is precluded, but good overprintability is nevertheless still given. To manufacture a security element according to the present invention, the additional layer that is at least pre-crosslinked by means of radiation is overcoated with the coating according to the present invention, especially with a UV-curing dispersion. This further layer is then merely physically dried to achieve freedom from tack and simultaneously maintain fusibility.

To improve counterfeit security, the security element preferably comprises, additionally, at least one visually and/or machine-verifiable security feature.

According to a preferred embodiment, the visually and/or machine-verifiable security feature comprises an optically variable effect, especially a diffraction pattern, a hologram, a color-shift effect or other interference effects. According to another preferred embodiment, the security element is provided with a pressure image, especially having positive or negative patterns or positive or negative characters, as a security feature. As a further security feature, the security element can also include fluorescent substances, phosphorescent substances and/or magnetic substances, which can especially be present in the substrate. It is obvious that combinations of such security features are also possible.

Preferably, a transparent plastic foil is used as the substrate of the security element according to the present invention. Such foils have the advantage that the irradiation with UV light can be done through the foil. For example, starting from the visible range, a PET foil is transparent to approximately 310 nm in the UV range. Thus, commercially available UV emitters can be used for irradiation. Alternatively, however, the substrate can also, if appropriate in addition, comprise a paper layer.

Particularly preferably, the security element comprises, besides the substrate and the coating that is substantially tack free at room temperature, at least one further layer, this being a layer that is reflective at least in some areas.

Likewise preferred are embodiments in which the security element comprises, besides the substrate and the coating that is substantially tack free at room temperature, at least one further layer, this being a layer in which a diffraction pattern is embossed in the form of a relief. The diffraction pattern is preferably provided at least in some areas with a reflective layer.

The coating that is substantially tack free at room temperature can also be used as an embossing lacquer. Standard thermoplastic embossing lacquers either require high temperatures and pressures when embossing, or become dull or matte upon application of the hologram to a substrate, since the embossed patterns soften and are deformed under application conditions. In standard, normally liquid UV lacquer systems, in turn, only a through-curing of the embossing layer is possible, making an edge-defined breakout impossible or only conditionally possible in manufacturing a patch.

If a security element according to the present invention is used, having a coating that is substantially tack free at room temperature on a substrate, particularly a plastic foil that, if appropriate, is provided with a separation layer (e.g. waxes), a low-melt thermoplastic embossing lacquer is first present. A motif, especially a diffraction pattern in the form of a relief, can be embossed in this lacquer layer. During this or afterwards (also possible after winding if set for block-free and given the appropriate glass point of the dispersion), the curing of the dispersion occurs through mask exposure. This means that the areas to be transferred later (patches) are exposed, and the areas in between are not. The areas in between thus remain soft and fusible, making an edge-defined melting-out possible later, while the exposed areas remain hard, also in the transfer process, and retain their embossing patterns. Thus, the coatings according to the present invention that are substantially tack free at room temperature can be crosslinked during the embossing process and are thus dimensionally stable and brilliant also at high pressures and temperatures.

According to a preferred embodiment of the present invention, the security element thus comprises, besides the substrate, a coating that is substantially tack free at room temperature, a diffraction pattern in the form of a relief being embossed in the coating that is substantially tack free at room temperature. Here, advantageously, the coating that is substantially tack free at room temperature is present in a form that is cured in some areas. The coating that is substantially tack free at room temperature is preferably provided with the diffraction pattern only in the cured areas.

Advantageously, at least the areas of the cured layer that are provided with the diffraction pattern are furnished at least in some areas with a reflective layer. Here, the reflective layer is preferably present in the form of positive or negative patterns.

Security elements that are prepared on a separate layer, for example a plastic foil, in the reverse order of how they later come to lie on the security paper, and are subsequently transferred to the security paper in the desired outline shapes by means of an adhesive or lacquer layer, are referred to as transfer elements. Here, after the transfer, the separate layer can be removed from the layer structure of the security element. To facilitate the detachment of the separate layer after the transfer of the security element, a separation layer can be provided between this layer and the part of the security element to be detached.

According to a further preferred embodiment, the security element thus comprises, besides the substrate and the coating that is substantially tack free at room temperature, at least one further layer, this being a separation layer. It is particularly preferable when the separation layer is disposed between the substrate and the coating that is substantially tack free at room temperature.

According to a further preferred embodiment, the security element coating that is substantially tack free at room temperature is present printed on with printing ink and crosslinked by means of radiation. Particularly coatings on paper should be dirt repellent, offer good printing ink adhesion and, in stability tests, not function as a separation point between paper and printing ink. By applying a defined temperature at which the crosslinking reaction of the coating that is substantially tack free at room temperature occurs, the degree of crosslinking can be controlled and, with it, the balance between printing ink adhesion and dirt repulsion set.

Alternatively, the printing can occur either after the complete crosslinking of the tack-free coating or before the crosslinking. If the printing occurs before the crosslinking, the coating that is substantially tack free at room temperature is printed on, resulting in a kind of partial dissolving of the coating by the printing ink. The printing ink combines with the coating, which further improves the adhesion. To avoid problems due to penetration or too strong absorption of the coating by the paper upon application, rheological additives (especially thickeners) can be used.

In a likewise advantageous variant, the tack-free coating is pre-crosslinked before being printed on with printing ink. However, here, too, complete crosslinking occurs only after printing.

In preferred embodiments, the security element is designed in the form of a security band, a security strip, a patch or another areal security element.

The substrate of the security element can also be present in the form of fibers, the fibers being surrounded by the coating that is substantially tack free at room temperature.

Particular advantages result when the security element is disposed over a window that is present in a security paper or a valuable article. This window is preferably manufactured with papermaking technology or diecut.

The present invention also includes a security paper for manufacturing security or value documents, such as banknotes, checks, identification cards, certificates and the like, that is furnished with a security element described above. Advantageously, besides the security element according to the present invention, the security paper exhibits at least one additional carrier substrate. Paper is preferred as the carrier substrate. A valuable article, branded article, value document or the like having such a security element is likewise comprised in the present invention.

Here, the security element can preferably be applied on the security paper or value document or embedded therein. Alternatively, the security element is embedded in the security paper or value document in the manner of a window security thread and is visible in window areas of the security paper or value document at its surface. The security element can also form a pivot security thread that appears alternately on opposing surfaces of the security paper or value document.

In the method for manufacturing one of the above described security elements, a coating that is substantially tack free at room temperature is applied at least partially to a substrate. Thereafter, the coating that is substantially tack free at room temperature is preferably at least physically dried.

According to a particularly preferred method variant, the coating that is substantially tack free at room temperature is applied as an aqueous dispersion.

According to a further preferred method variant, a cationically radiation-curing resin is applied as the coating that is substantially tack free at room temperature.

In a preferred embodiment of the method, before application of the coating that is substantially tack free at room temperature, at least one further layer is applied to the substrate at least in some areas. This further layer can be a layer that is crosslinkable by means of radiation and that is at least pre-crosslinked by means of radiation before the tack-free coating is applied. Through the pre-crosslinking, later plasticizing, which is associated with the threat of loss of adhesion to the substrate, can be minimized.

In a likewise advantageous variant, the coating that is substantially tack free at room temperature is crosslinked by ultraviolet radiation or by electron radiation.

The present invention also comprises a method for manufacturing an above described security paper or valuable article, the security paper or the valuable article being furnished with an above described security element.

Here, according to a preferred method variant, the security element is applied at elevated pressure and elevated temperature to a carrier substrate and, subsequently, the coating that is substantially tack free at room temperature is at least pre-crosslinked by means of radiation. If the security element is present as a transfer element, the coating that is substantially tack free at room temperature can be completely crosslinked after the removal of the substrate and, if present, the separation layer.

According to a further preferred method variant, immediately before application of the security element to the security paper or the valuable article, the coating that is substantially tack free at room temperature is irradiated from the direction of the coating with shortwave radiation, especially shortwave visible radiation or UV radiation, and subsequently applied to a carrier substrate at elevated pressure and elevated temperature. The exposure from the coating side is advantageous since stress on the carrier substrate by UV radiation and UV stress on the material of the security element is avoided or at least significantly reduced.

In addition, the present invention comprises the use of one of the above described security elements for manufacturing foil-composite banknotes, as well as the use as packaging material. For example, sterilizable foil packages are sealable and crosslinkable with a security element according to the present invention. With successful UV sterilization, the sealing seam is simultaneously crosslinked and secure.

Further exemplary embodiments and advantages of the present invention are described below with reference to the drawings. To improve clarity, a depiction to scale and proportion was dispensed with in the drawings.

Figure 2:
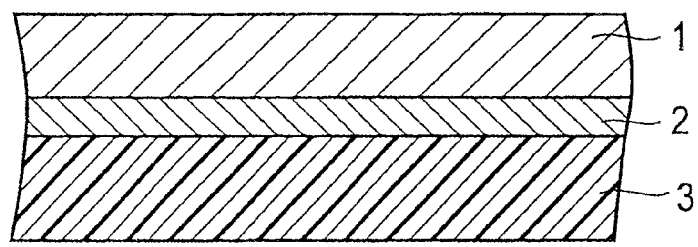
Figure 3:
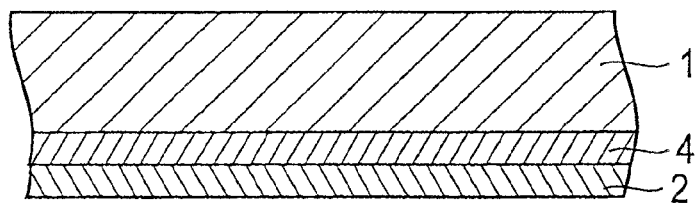
Figure 4:
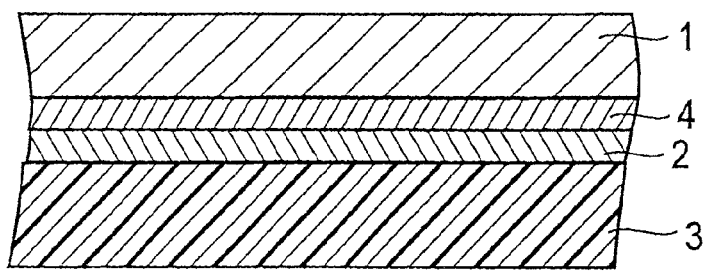
Figure 5:
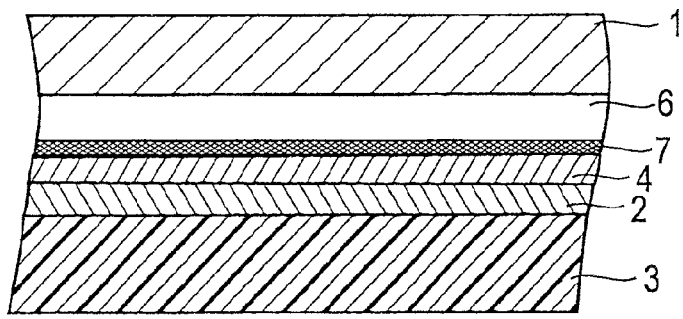
Figure 6:
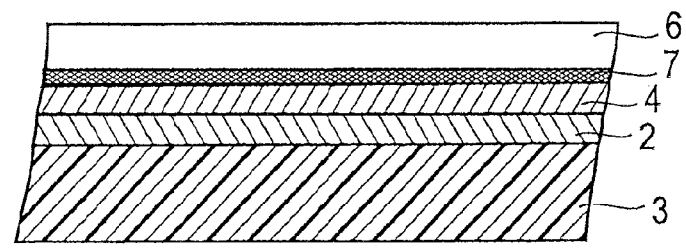
Figure 7:
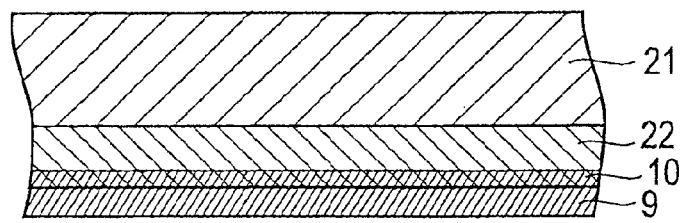
Figure 8:
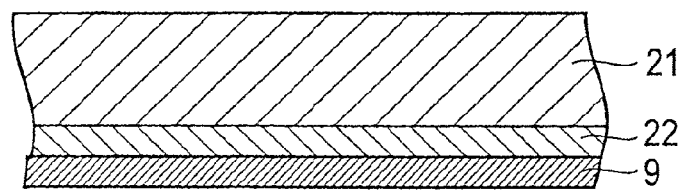
Figure 9:
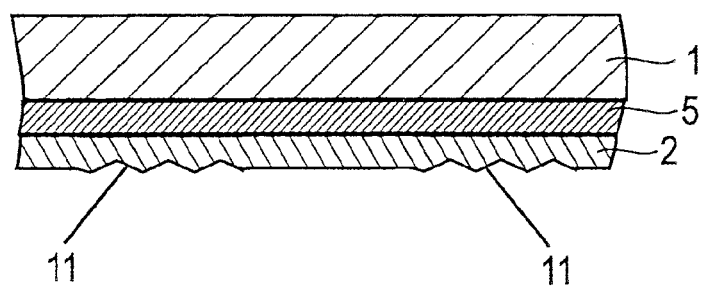
Figure 10:
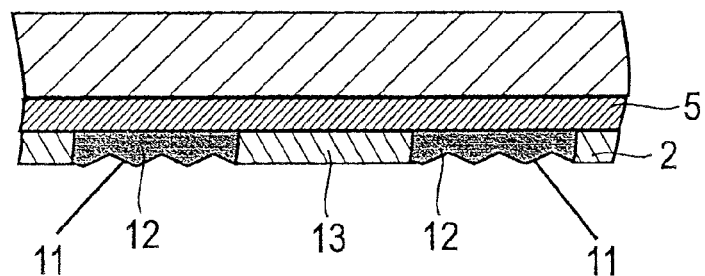
Figure 11:
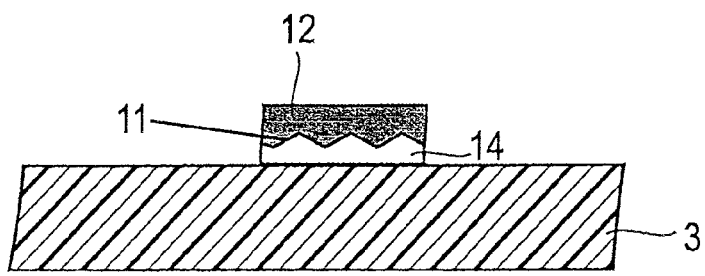
Figure 12:
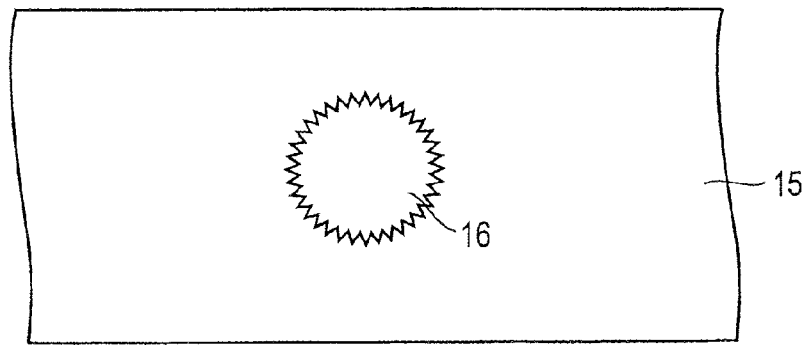
Figure 13:
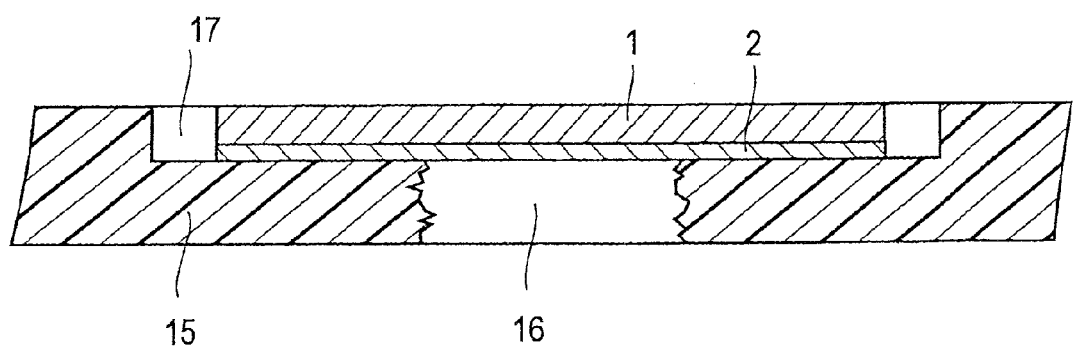

Shown are:

FIG. 1 in cross section, a schematic diagram of a security element according to the present invention having a coating that is substantially tack free at room temperature;

FIG. 2 in cross section, a schematic diagram of a security paper that is furnished with the security element in FIG. 1;

FIG. 3 a schematic diagram of a security element according to another exemplary embodiment of the present invention, in cross section;

FIG. 4 in cross section, a schematic diagram of a security paper that is furnished with the security element in FIG. 3;

FIG. 5 a schematic diagram of a security paper according to another exemplary embodiment of the present invention, in cross section;

FIG. 6 in cross section, a schematic diagram of the security paper in FIG. 5 after the detachment of the substrate of the security element formed as a transfer element;

FIG. 7 a schematic diagram of a security element or of a security paper according to another exemplary embodiment of the present invention, in cross section;

FIG. 8 a schematic diagram of a security element or of a security paper according to another exemplary embodiment of the present invention, in cross section;

FIG. 9 a schematic diagram of a security element, formed as a transfer element, according to another exemplary embodiment of the present invention, in cross section;

FIG. 10 a schematic diagram of the security element in FIG. 9 after exposure with UV radiation, in cross section;

FIG. 11 a schematic diagram of a security paper according to another exemplary embodiment of the present invention, in cross section;

FIG. 12 a schematic diagram of a value document, as viewed from above;

FIG. 13 a cross section through the value document in FIG. 12.

FIG. 1 shows a schematic diagram of a security element according to the present invention having a substrate 1 and a coating 2 that is substantially tack free at room temperature. To manufacture the security element, a dispersion (UV dispersion) that is curable by means of UV radiation, for example, is applied to the substrate 1, for example to a plastic foil, especially a PET or OPP foil. The UV dispersion is dried (e.g. at 80° C.), creating a coating 2 that is substantially tack free at room temperature.

The security element and all security elements described below can be furnished with further security features, for example a hologram or a print design, that are not depicted in the corresponding drawings.

FIG. 2 shows, in cross section, a schematic diagram of a security paper that is furnished with the security element in FIG. 1. To manufacture the security paper, the security element in FIG. 1 is transferred to a carrier substrate 3, e.g. paper, through a heat seal process at elevated pressure and elevated temperature (e.g. at 140° C.). Thus, in this case, the coating that is substantially tack free at room temperature assumes the function of a heat seal coating.

Subsequently, the coating 2 in FIG. 1 is crosslinked through the action of UV radiation (e.g. Hg and Fe emitters) such that, finally, a security paper having a radiation-crosslinked, infusible coating 2 and a covering substrate 1, e.g. a plastic foil, is obtained.

FIG. 3 shows, in cross section, a schematic diagram of a security element according to another exemplary embodiment of the present invention. To manufacture the security element, a UV dispersion is applied to a substrate 1, for example to a plastic foil. The plastic foil is, for example, a PET or OPP foil. The UV dispersion is dried (e.g. at 80° C.) and crosslinked through the action of UV radiation, creating an infusible coating 4. A further coating having a UV dispersion is applied over this coating 4 and dried (e.g. at 80° C.), creating a coating 2 that is substantially tack free at room temperature. The formation of such a two-layer coating has the advantage that good adhesion to the substrate 1 in the subsequent heat seal process is ensured.

FIG. 4 shows, in cross section, a schematic diagram of a security paper that is furnished with the security element in FIG. 3. To manufacture the security paper, the security element in FIG. 3 is applied through a heat seal process at elevated pressure and elevated temperature (e.g. at 140° C.) to a carrier substrate 3 composed of paper. Subsequently, the coating 2 in FIG. 3 is crosslinked through the action of UV radiation (e.g. Hg and Fe emitters) such that, finally, a security paper having a two-layer, radiation-crosslinked, infusible coating 2, 4 and a covering substrate 1, here a plastic foil, is obtained.

A distinguishing feature of the described security elements is excellent adhesion of the coatings 2, 4 to the substrate 1. This adhesion is not lost even at the elevated temperatures of the heat seal process. Should adhesion problems nevertheless occur with one of the plastic foils used, then, for example, a pressure-pretreated foil (e.g. Hostaphan RNK2600, Mitsubishi Polyester Film) can be used.

FIG. 5 shows, in cross section, a schematic diagram of a security paper according to another exemplary embodiment of the present invention. To manufacture the security element formed here as a transfer element, with which the security paper shown in FIG. 5 is equipped, an embossing lacquer 6 is applied to a substrate 1, for example to a PET substrate foil. Optionally, a separation layer, e.g. composed of wax, can be applied between the PET substrate foil and the embossing lacquer layer 6. The embossing lacquer 6 is provided with a reflective layer 7, for example a metal layer or a high-index layer. All metals and many metal alloys may be used as reflective materials. Examples of suitable high-index materials include CaS, $CrO_2$, ZnS, $TiO_2$ and $SiO_x$. The reflective layer 7 can also be applied in the form of patterns or characters, particularly positive or negative patterns. The embossment of the embossing lacquer 6, for example a diffraction pattern in the form of a relief that is not shown here for the sake of clarity and that is present on the side of the embossing lacquer 6 facing away from the substrate 1, can occur before or after the application of the reflective layer 7.

A UV dispersion is applied over the reflective layer 7 and thermally dried (e.g. at 80° C.), creating a coating 4 that is substantially tack free at room temperature. In this case, the coating that is substantially tack free at room temperature can also serve as a protective lacquer for the metallization. Furthermore, if needed, a primer/adhesion promoter layer can be applied between the reflective layer 7 and the coating 4.

Through UV irradiation from the direction of the coating, i.e. from the substantially UV-radiation-permeable side of the security paper, the UV dispersion is crosslinked, creating an infusible coating 4. Subsequently, a further coating having a UV-curing dispersion is applied to this crosslinked UV dispersion layer and thermally dried (e.g. at 80° C.). Through the drying of the UV dispersion, a coating 2 is created that is substantially tack free at room temperature.

To manufacture the depicted security paper, this security element is subsequently applied through a heat seal process at elevated pressure and elevated temperature (e.g. at 140° C.) to a carrier substrate 3 composed of paper. Subsequently, the coating 2 can be pre-crosslinked through the action of UV radiation (e.g. Hg and Fe emitters) through the PET substrate foil, but the pre-crosslinking is not compulsory here.

Subsequently, the PET substrate foil and, if present, the separation layer is removed. However, the PET substrate foil can also remain on the embossing lacquer layer 6 as a protective layer. In this case, no separation layer is provided. Finally, the pre-crosslinked coating 2 is crosslinked through the action of UV radiation (e.g. undoped Hg emitters) through the reflective layer 7 such that, finally, the security paper shown schematically in FIG. 6 in cross section having a carrier substrate 3 composed of paper, a two-layer, radiation-crosslinked, infusible coating 2, 4, a reflective layer 7 and an embossing lacquer layer 6 is obtained.

The crosslinking with the aid of UV radiation through a metal layer presents no technological problem, since metallizations (especially aluminum) exhibit relatively high transparency, particularly in the UV range. Metallization with aluminum (optical density=2.0), for example, is 5% to 10% transparent to radiation in the longwave UV range. Moreover, the embossing lacquer layer 6 effects, in connection with the metal layer, very good oxygen exclusion, which results in improved UV crosslinking of the coatings 2, 4.

FIG. 7 shows, in cross section, a schematic diagram of a security element or a security paper according to another exemplary embodiment of the present invention. To manufacture the security element or paper, a UV dispersion is applied contiguously to a substrate 21 composed of paper. The UV dispersion can also be applied to both sides of the substrate 21 such that the substrate 21 is completely surrounded by the coating 22, which is not shown here for the sake of clarity. Furthermore, if needed, the UV dispersion can include rheological additives. The UV dispersion is dried (e.g. at 80° C.), creating a coating 22 that is substantially tack free at room temperature. Subsequently, the substantially tack-free coating 22 is printed on with a printing ink 9.

In this way, the UV-curing coating 22 is "partially dissolved" in the upper area 10 facing away from the paper substrate, i.e. the printing ink combines with the coating 22. Then the coating 22 is crosslinked through the action of UV radiation (e.g. Hg and Fe emitters) such that a security element or paper according to the present invention having a paper layer and a now radiation-crosslinked, infusible coating 22 that is printed on with the printing ink 9 is obtained.

Alternatively, to manufacture the security element or paper schematically depicted in cross section in FIG. 8, according to another exemplary embodiment of the present invention, a UV dispersion is applied contiguously to a substrate 21 composed of paper. Here, too, the UV dispersion can be applied to both sides of the substrate 21. The UV dispersion is dried (e.g. at 80° C.), creating a coating 22 that is substantially tack free at room temperature. Subsequently, the coating 22 is crosslinked through the action of UV radiation (e.g. Hg and Fe emitters) such that a security element or paper according to the present invention having a radiation-crosslinked, infusible coating 22 is obtained. The radiation-crosslinked coating 22 can subsequently be printed on with printing ink 9, the printing ink adhesion and the dirt-repelling properties being able to be adjusted via the degree of crosslinking of the coating 22.

FIG. 9 shows, in cross section, a schematic diagram of a security element according to another exemplary embodiment of the present invention, designed as a transfer element. To manufacture the security element, a coating having a UV dispersion is applied to a substrate 1, for example to a PET substrate foil. The UV dispersion is thermally dried (e.g. at 80° C.), creating a coating 2 that is substantially tack free at room temperature. Optionally, a separation layer 5 can be applied between the PET substrate foil and the coating 2.

A diffraction pattern 11 can be embossed in the coating 2. Thus, in this case, the UV-curing dispersion is used as an embossing lacquer. During this process or subsequently, the curing of the coating 2 occurs through the action of UV radiation. The exposure is carried out through a mask. As evident from FIG. 10, the UV exposure is carried out only at the sites 12 at which a motif was previously embossed in the form of a diffraction pattern 11. In this way, the patches to be transferred in a subsequent step are exposed, but the areas lying therebetween are not. The in-between areas 13 thus remain soft and fusible, making an edge-defined melting-out possible when transferring the security element to a carrier substrate. The exposed areas 12, on the other hand, remain hard also in the transfer process, and their embossing patterns are retained. Optionally, the coating 2, including the diffraction patterns 11 or also just the areas provided with a diffraction pattern can be provided with a metal layer or a high-index layer, which is not shown here for the sake of clarity. Furthermore, the metal layer or high-index layer can be applied in the form of patterns or characters, particularly positive or negative patterns.

FIG. 11 shows, in cross section, a schematic diagram of a security paper that is furnished with the security element in FIG. 10. After the crosslinking of the coating 2, effected by UV exposure and depicted in FIG. 10, at the sites 12 of the coating 2 at which a motif was previously embossed in the form of a diffraction pattern 11, and, if applicable, the application of a metal layer or a high-index layer, the patch is applied by means of a heat seal adhesive 14 to a carrier substrate 3. Through the UV exposure that is limited to the sites 12, the in-between areas 13 remain soft and fusible, making an edge-defined melting-out possible when transferring the security element through a hot stamp. The exposed areas 12, on the other hand, remain hard also in the transfer process, and their embossing patterns are retained.

But it is also possible to use, instead of the heat seal adhesive, a coating composed of a UV crosslinkable dispersion. Here, however, care must be taken that the UV crosslinkable dispersion is transferred and crosslinked by means of UV radiation only after the removal of the uncured in-between areas 13.

FIG. 12 shows a top view of a value document 15, for example a banknote, that is furnished with a through opening 16. The opening 16 is preferably manufactured with papermaking technology or diecut. The mechanical manufacture of such window openings 16 is described in DE 101 63 381 A1.

FIG. 13 shows a cross section of the value document 15 depicted in FIG. 12, with the difference that the opening 16 is obstructed by a security element according to the present invention. The security element exhibits a substrate 1 and a coating 2 that is substantially tack free at room temperature.

The security element is preferably disposed in a depression 17 that surrounds the opening 16. The depression 17 can be produced through subsequent calendering of the paper web, i.e. by compressing the paper fibers. Alternatively, the depression 17 can also be produced by an actual reduction of the paper thickness in this area. This happens most easily directly during manufacturing of the paper web, in that the sheet formation in this area is designed to be thinner through appropriate formation of the screen.

In a further exemplary embodiment that is not depicted, the security element consists of a substrate and a coating that is substantially tack free at room temperature. To manufacture the security element, a cationically radiation-curing resin, for example, particularly an epoxide-modified vinyl copolymer (e.g. UCAR VERR-40, The Dow Chemical Company) that is provided with a photoinitiator suitable for cationic radiation curing, is applied to the substrate, for example to a plastic foil, particularly a PET or OPP foil. The cationically radiation-curing resin is dried (e.g. at 80° C.), creating a coating that is substantially tack free at room temperature.

To manufacture a security paper furnished with the above described security element, the security element is transferred at elevated pressure and elevated temperature (e.g. at 140° C.) to a carrier substrate, e.g. paper, through a heat seal process. The thermal crosslinking is already started here. Subsequently, the cationically radiation-curing coating is crosslinked through the action of UV radiation (e.g. Hg and Fe emitters) such that, finally, a security paper having a radiation-crosslinked, infusible coating and a covering substrate, e.g. a plastic foil, is obtained.

Alternatively, the coating can also be only purely thermally crosslinked. For this, the security element is transferred at elevated pressure and elevated temperature (e.g. at 140° C. to 160° C.) to a carrier substrate, e.g. paper, only through a heat seal process. Here, the thermal crosslinking takes place within the heat seal process. It is obvious that, in this method variant, the use of a photoinitiator can be dispensed with.

In contrast to radical radiation curing, cationic radiation curing is a slower process that continues also after irradiation has ended. While radicals are quickly trapped, in cationic radiation curing, an acid is released that catalyzes the crosslinking reaction in the coating. Thus, in a further variant of the above exemplary embodiment, the cationically radiation-curing coating can be exposed from the coating side with shortwave radiation (UV or shortwave blue radiation) immediately prior to the application of the security element. As the beam source, either common UV emitters (doped or undoped) or preferably UV light-emitting diodes can be used. In addition to positive security-related aspects, UV light-emitting diodes also exhibit technological advantages, since they result in lower heat input and lower energy consumption. The exposure from the coating side is advantageous since no stress occurs on the carrier substrate, e.g. paper, through UV radiation, and there is less UV stress on the material of the security element. The crosslinking reaction is initiated by the exposure. At the time of the application to the carrier substrate, due to the short time span, it has not yet progressed so far that the plasticization of the coating would be hampered. However, since the reaction continues by itself without further actions, the security paper provided with the security element displays the stipulated stabilities.

We claim:

1. A method for manufacturing a security paper or valuable article, comprising the steps of:

applying a security element to a carrier substrate of the security paper or valuable article through a heat seal process at elevated pressure and elevated temperature, the security element including a first substrate at least partially coated with a coating that is substantially tack free at room temperature before crosslinking, wherein the coating is substantially tack free before crosslinking if foil pieces of about 100 cm², coated with the coating, that are stacked, loaded with a weight of 10 kg and stored for 72 hours at 40° C. can be easily separated from one another afterwards without damaging the coatings;

wherein the coating includes at least one radiation-crosslinkable component not yet crosslinked at the time of applying the security element to the carrier substrate;

the security element being applied such that the coating operates as a heat seal coating between the carrier substrate and the security element and the security element is stable and hot water resistant after crosslinking.

2. The method according to claim 1, the coating being at least physically dried prior to applying the security element to the carrier.

3. The method according to claim 1, the coating being applied to the security element as an aqueous dispersion.

4. The method according to claim 1, wherein the coating comprises a cationically radiation-curing resin.

5. The method according to claim 1, the security element including at least at least one further layer applied to the first substrate in at least some areas, prior to the applying step.

6. The method according to claim 5, wherein the further layer is crosslinkable by radiation and is at least partially pre-crosslinked by radiation prior to the applying step.

7. The method according to claim 1, further comprising the steps of:

printing on the coating with a printing ink, and subsequently crosslinking the coating by irradiation.

8. The method according to claim 1, further comprising the steps of:
- crosslinking the coating by irradiation, thereby generating a crosslinked coating; and subsequently
- printing on the crosslinked coating with a printing ink.

9. The method according claim 1, further comprising the steps of:
- pre-crosslinking the coating by irradiation, and subsequently
- printing on the coating with a printing ink; and
- crosslinking completely the coating by irradiation.

10. The method according to claim 1, further comprising the step of
- crosslinking the coating by ultraviolet radiation or electron radiation.

11. The method according to claim 1, after the step of applying, pre-crosslinking the coating by radiation.

12. The method according to claim 1, further comprising the steps of:
- removing the first substrate, followed by
- crosslinking completely the coating by radiation.

13. The method according to claim 1, further comprising the step of
- irradiating the coating with shortwave radiation from the direction of the coating immediately prior to the applying step.

14. The method of claim 1, the security paper being a foil-composite banknote.

15. The method of claim 1, the security paper being packaging material.

* * * * *